United States Patent
Smith et al.

(10) Patent No.: US 8,576,111 B2
(45) Date of Patent: Nov. 5, 2013

(54) SYNTHETIC APERTURE RADAR SYSTEM AND METHODS

(75) Inventors: Ryan L. Smith, Salem, UT (US); Logan C. Harris, Orem, UT (US); David G. Long, Provo, UT (US); Adam E. Robertson, Provo, UT (US); Adam R. Harper, Provo, UT (US); Britton T. Quist, Orem, UT (US); Joshua M. Hintze, Austin, TX (US)

(73) Assignee: IMSAR LLC, Springville, UT (US)

( * ) Notice: Subject to any disclaimer, the term of this patent is extended or adjusted under 35 U.S.C. 154(b) by 602 days.

(21) Appl. No.: 12/488,668

(22) Filed: Jun. 22, 2009

(65) Prior Publication Data

US 2010/0214160 A1    Aug. 26, 2010

Related U.S. Application Data

(60) Provisional application No. 61/154,474, filed on Feb. 23, 2009.

(51) Int. Cl.
*G01S 13/90*    (2006.01)

(52) U.S. Cl.
USPC .......................... 342/25 F; 342/75

(58) Field of Classification Search
USPC ....................... 342/25 R–25 F, 75
See application file for complete search history.

(56) References Cited

U.S. PATENT DOCUMENTS

| | | | | |
|---|---|---|---|---|
| 4,005,423 A | * | 1/1977 | Webb | 342/194 |
| 4,045,795 A | * | 8/1977 | Fletcher et al. | 342/25 E |
| 4,132,989 A | * | 1/1979 | Frosch et al. | 342/25 D |
| 4,594,593 A | * | 6/1986 | Nohmi | 342/25 D |
| 5,394,151 A | * | 2/1995 | Knaell et al. | 342/25 F |
| 5,483,549 A | * | 1/1996 | Weinberg et al. | 375/151 |
| 5,907,568 A | * | 5/1999 | Reitan, Jr. | 342/26 B |
| 6,029,116 A | * | 2/2000 | Wright et al. | 702/32 |
| 6,563,451 B1 | * | 5/2003 | Krikorian et al. | 342/25 R |
| 7,136,010 B2 | * | 11/2006 | Cirillo et al. | 342/25 R |
| 7,196,653 B2 | * | 3/2007 | Hall et al. | 342/25 F |
| 7,205,927 B2 | * | 4/2007 | Krikorian et al. | 342/25 A |
| 7,522,097 B2 | * | 4/2009 | Wakeman | 342/174 |
| 7,656,362 B2 | * | 2/2010 | Alberding et al. | 343/872 |

OTHER PUBLICATIONS

Bailey et al. "Radar Video Processing Using the CCD Chirp Z Transform". International Conference on the Application of Charge-Coupled Devices. Oct. 1975. pp. 283-290.*

* cited by examiner

*Primary Examiner* — Matthew M Barker
(74) *Attorney, Agent, or Firm* — Utah Valley Patent; Steve McDaniel

(57) ABSTRACT

A compact synthetic aperture radar system and associated methods are disclosed.

2 Claims, 14 Drawing Sheets

SYNTHETIC APERTURE RADAR SYSTEM AND METHODS

RELATED APPLICATIONS

This application claims priority to U.S. Provisional Patent Application 61/154,474 entitled "SYNTHETIC APERTURE RADAR SYSTEM AND METHODS" and filed on 23 Feb. 2009 for Ryan Lee Smith, Logan Carl Harris, David Long, Adam Harper, Britton Quist, and Joshua Hintze. The aforementioned application is hereby incorporated by reference including appendices submitted therewith.

BACKGROUND OF THE INVENTION

1. Field of the Invention

The claimed inventions relate to radar systems and methods.

2. Description of the Related Art

Currently available radar systems typically require expensive bulky components that limit the applications wherein such systems can be deployed. Furthermore, each application of radar technology often requires different processing algorithms. What is needed is a combination of algorithms and methodologies that can be applied to a wide variety of applications using compact, lower-cost components.

BRIEF SUMMARY OF THE INVENTION

The present invention has been developed in response to the present state of the art, and in particular, in response to the problems and needs in the art that have not yet been fully solved by currently available radar systems. Accordingly, the present invention has been developed to provide synthetic aperture radar systems and methods that overcome shortcomings in the art.

In certain embodiments, a system for acquiring and processing radar data includes a multilayer printed circuit board with antenna elements printed thereon including a set of transmit patches and a set of receive patches with an isolation element affixed to the multilayer printed circuit board and placed between the transmit patches and the receive patches. The isolation element increases electromagnetic isolation between the transmit patches and the receive patches.

The system may also include a radar receiver and transmitter operably connected to the radar antenna and a radar data acquisition module that converts a demodulated radar return signal provided by the radar receiver to a digital baseband signal. In addition, the radar data acquisition module interface may mimic a CCD video chip and provide the digital baseband signal as a sequence of scanlines to a video processor that computes Doppler shift data for various ranges, and estimates attitude parameters such as a vehicle pitch and yaw from the Doppler shift data. The system may compensate for the vehicle pitch and yaw and improve data quality by initiating an orientation adjustment of the radar antenna.

The system may also execute a variety of methods described herein including methods that leverage attitude parameters extracted from Doppler shift and power profile data to improve data processing. The described methods may be embodied as a computer program product or computer readable medium comprising computer readable program codes configured to conduct the described methods.

The system may include an enclosure with a gimbal mount integrally formed therein as well as a number of isolation chambers including a transmitter chamber that covers at least a portion of the radar transmitter and a receiver chamber that covers at least a portion of the radar receiver. The enclosure may be formed from a plastic material (for example using a 3-D printing process) and electroplated to electromagnetically isolate the various subsystems covered by the isolation chambers.

The system may also include a radome formed of a water repellent breathable fabric and configured to cover the radar antenna. The water repellent breathable fabric may comprise a porous membrane capable of passing water vapor without passing liquid water and a fabric backing bonded to the porous membrane. More conventional solid radomes may also be used.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
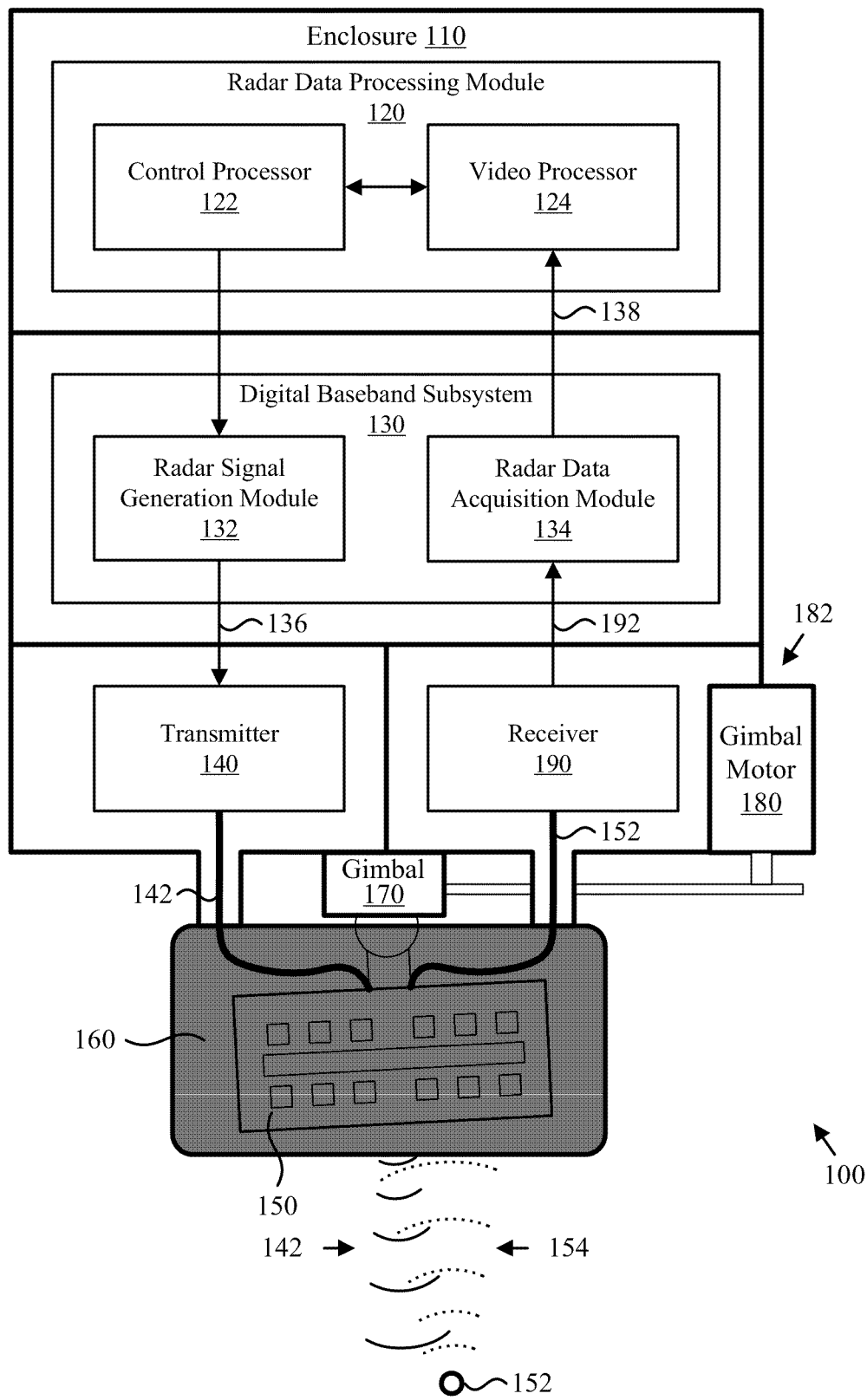
FIG. 1 is a block diagram depicting a synthetic aperture radar system that is consistent with one or more embodiments of the claimed inventions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program product or computer-readable medium may take any form capable of causing execution of a program of machine-readable instructions on a digital processing apparatus. For example, a computer-readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram depicting a synthetic aperture radar system 100 that is consistent with one or more embodiments of the claimed inventions. As depicted, the synthetic aperture radar system 100 includes an enclosure 110, a radar data processing module 120, a digital baseband subsystem 130, a transmitter 140, an antenna 150, a radome 160, a gimbal 170, a gimbal motor 180, and a receiver 190. The synthetic aperture radar system 100 provides high-resolution radar processing in a very compact footprint.

The enclosure 110 provides isolation between various subsystems of the system 100. In one embodiment, the enclosure 110 is formed of a plastic material by a 3-D printing process. The enclosure may be electroplated to increase the electromagnetic isolation between the between the various subsystems. Electroplating may also increase the mechanical strength of the enclosure. In one embodiment, the enclosure is electroplated to provide mechanical integrity to an acceleration force of at least 25 g. In certain embodiments, a gimbal mount (not shown) is integrally formed into the enclosure 110. The enclosure 110 may also include a gimbal motor mount 182 integrally formed into the enclosure that mates to the gimbal motor 180.

The depicted radar data processing module 120 includes a control processor 122 and a video processor 124. The control processor 122 may configure or direct the digital baseband subsystem 130, the video processor 124, the transmitter 140, the gimbal motor 180, and the receiver 190, as well as other modules relevant to transmitting, receiving, and processing radar signals. In one embodiment, the control processor 122 and the video processor 124 are the same processor.

The depicted digital baseband subsystem 130 includes a radar signal generation module 132 and a radar data acquisition module 134. The radar signal generation module 132 may generate a modulation signal 136. In one embodiment, the modulation signal 136 is a sawtooth waveform appropriate for frequency modulation. The transmitter 140 may receive the modulation signal 136 and provide a transmission signal 142 to the antenna 150. The antenna 150 may radiate the transmission signal 142 and receive reflections of that signal from one or more targets 152 as a radar return signal 154.

The radome 160 may protect the antenna 150 from the environment without significantly attenuating the transmission signal 142 and the radar return signal 152. In one embodiment, the radome is made from a breathable water repellant fabric. The gimbal 170 enables adjustment of the orientation of the antenna 150 and the viewing angle of the radar system 100 within the radome 160. The orientation of the antenna 150 may be changed by one or more gimbal motors 180 that are mechanically coupled to the gimbal 170 and/or the antenna 150.

The radar return signal 152 may be received by the receiver 190 and demodulated to provide a demodulated radar return signal (i.e. analog baseband signal) 192. The radar data acquisition module 134 may convert the demodulated radar return signal 192 to a digital baseband signal 138.

In certain embodiments, the radar data acquisition module 134 interface mimics a CCD video chip and provides the digital baseband signal 138 to the video processor as a sequence of scanlines (not shown) where each scanline corresponds to a radar return signal received in response to a transmitted radar signal of a limited duration. The video processor may be configured to interface with a charge coupled device (CCD) video chip and receive and process the sequence of scanlines. See the description of FIGS. 8-14 for additional detail. Mimicking a CCD video chip enables the radar system 100 to use a video processor such as the video processor 124 to process the digital baseband signal 138. The video processor 124 may be programmed and/or configured to process the sequence of scanlines corresponding to the digital baseband signal 138 and extract target image data and target information therefrom such as magnitude and phase information.

Figure 2:
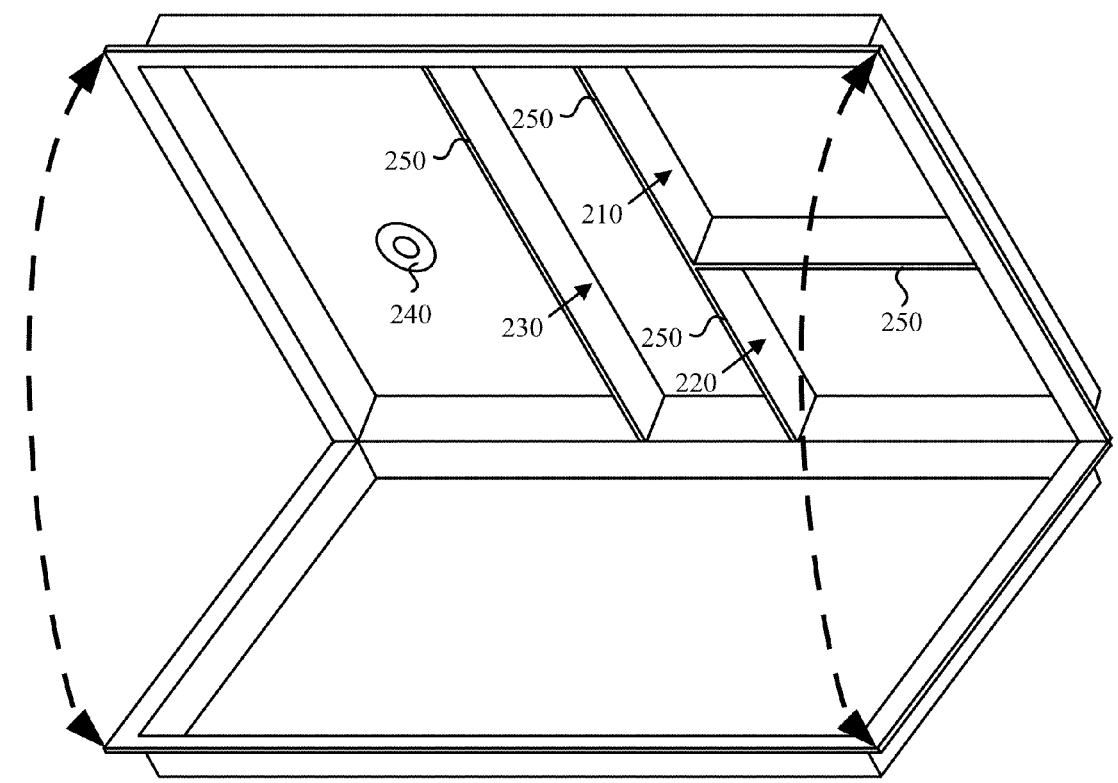
FIG. 2 is a perspective view diagram illustrating a radar enclosure that is consistent with one or more embodiments of the claimed inventions.

FIG. 2 is a perspective view diagram illustrating a radar enclosure 200 that is consistent with one or more embodiments of the claimed inventions. As depicted, the enclosure includes a transmitter chamber 210, a receiver chamber 220, a digital baseband chamber 230, and may include other chambers as needed. The enclosure 200 may also have a gimbal mount 240 integrally formed therein and dimensioned for directly mounting a gimbal to the enclosure. The radar enclosure 200 is one example of the enclosure 110 depicted in FIG. 1.

The radar enclosure 200 may be formed of a plastic material and enclose one or more circuit boards with the radar transmitter 140, the radar receiver 190, the digital baseband subsystem 130, and other modules of the radar system 100 assembled thereon. The various chambers on the enclosure 200 correspond to modules of the radar system 100, as well as physical regions on the enclosed circuit boards (not shown). Due to the electroplating of the enclosure 200, and a snug (subwavelength) fit between the bottom edges of the chamber ribs 250 and the (ground plane layers on the) enclosed circuit boards, the various chambers function to cover and electromagnetically isolate the covered modules from one another as well as the operating environment in which the enclosure 200 is deployed.

In the depicted embodiment, the transmitter chamber 210 covers at least a portion of the radar transmitter 140, and the receiver chamber 220 covers at least a portion of the radar receiver 190 sufficient to isolate the receiver chamber from the transmitter chamber by at least 80 dB and the digital baseband subsystem 130 from the radar receiver and transmitter by at least 60 dB. In one embodiment, the provided isolation is greater than 100 dB for the radar receiver and transmitter and 80 dB for the digital baseband subsystem 130. The combination of elements depicted and described herein increase the compactness of radar system 100. In one embodiment, the enclosure 110 and the contents contained therein occupy less than 150 cubic inches of volumetric space.

Figure 3A:
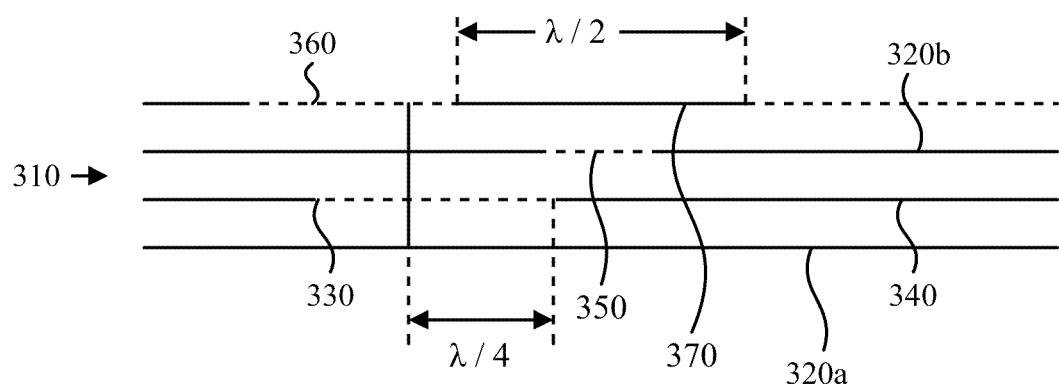
FIGS. 3a and 3b are cross-sectional and top view diagrams illustrating an antenna feed structure that is consistent with one or more embodiments of the claimed inventions.
Figure 3B:
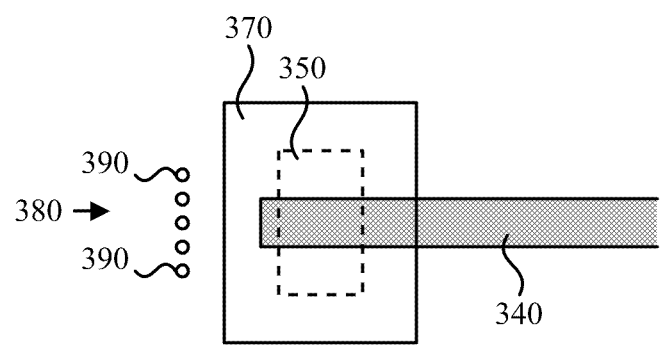

FIGS. 3a and 3b are cross-sectional and top view diagrams illustrating an antenna feed structure 300 that is consistent with one or more embodiments of the claimed inventions. As depicted, the antenna feed structure 300 includes a multilayer printed circuit board 310 with ground plane layers 320, a signal layer 330 with a transmission line trace 340, a coupling aperture 350, an antenna layer 360 with one or more antenna elements 370, and a via fence 380. The antenna feed structure 300 reduces signal crosstalk, reduces the required spacing between antennas, and facilitates providing receive and transmit antennas on a single planer circuit board.

In the depicted arrangement, the signal layer 330 is disposed between the ground plane layers 320a and 320b and the antenna layer 360 is disposed above ground plane layers. The transmission line trace 340 and associated layer spacings and impedances may be configured to propagate a carrier signal (not shown) that may be provided by a transmitter or the like. The coupling aperture 350 formed on the ground plane layer 320a enables the carrier signal propagated by the transmission line trace 340 to couple to the antenna element 370 on the antenna layer 360.

The via fence 380 may include multiple circuit board vias 390 that electrically connect at least the ground plane layer 320a with the ground plane layer 320b. The via fence 380 may be disposed near an endpoint of the transmission line trace 340 and configured to inhibit further propagation of the transmission signal between the ground plane layers 320a and 320b. In the depicted embodiment, the via fence is linear. In another embodiment, the via fence may be curved to at least partially encompass the coupling aperture 350 and/or the antenna element 370. In one embodiment, a (shortest) distance between the via fence 380 and the transmission line trace 340 is approximately one quarter of a wavelength for the carrier signal. The distance between the via fence 380 and the coupling aperture 350 may also be approximately one quarter of a wavelength for the carrier signal.

Figure 4A:
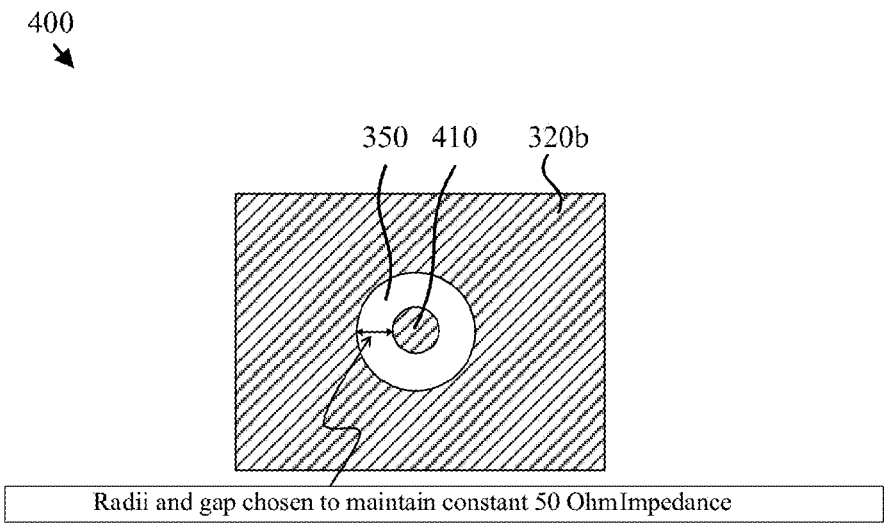
FIGS. 4a and 4b are top view and perspective view diagrams illustrating a antenna coupling structure that is consistent with one or more embodiments of the claimed inventions.
Figure 4B:
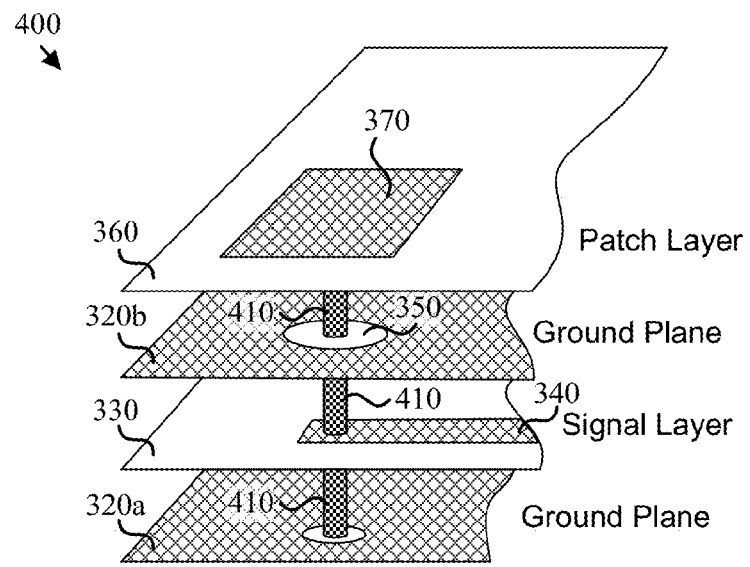

FIGS. 4a and 4b are top and perspective view diagrams illustrating an antenna coupling structure 400 that is consistent with one or more embodiments of the claimed inventions. The antenna coupling structure 400 uses a coupling via 410 within the coupling aperture 350 to essentially form a coaxial waveguide through the ground plane layer 320b. The antenna coupling structure 400 may be used in conjunction with the antenna feed structure 300.

The dimensions of the coupling via 410 and the coupling aperture 350, as well as the electromagnetic properties of the associated layers, may be selected to provide a desired impedance for the antenna coupling structure 400. The desired impedance may facilitate waveguiding (i.e. RF coupling) between the transmission line trace and the antenna element 370. Depending on the desired coupling characteristics, the coupling via 410 may be connected to the transmission line trace 340, the antenna element 370, or both. In the depicted embodiment, the coupling via 410 extends from the ground plane layer 320a to the antenna element 370 without connecting with the ground plane layers 320.

Figure 5:
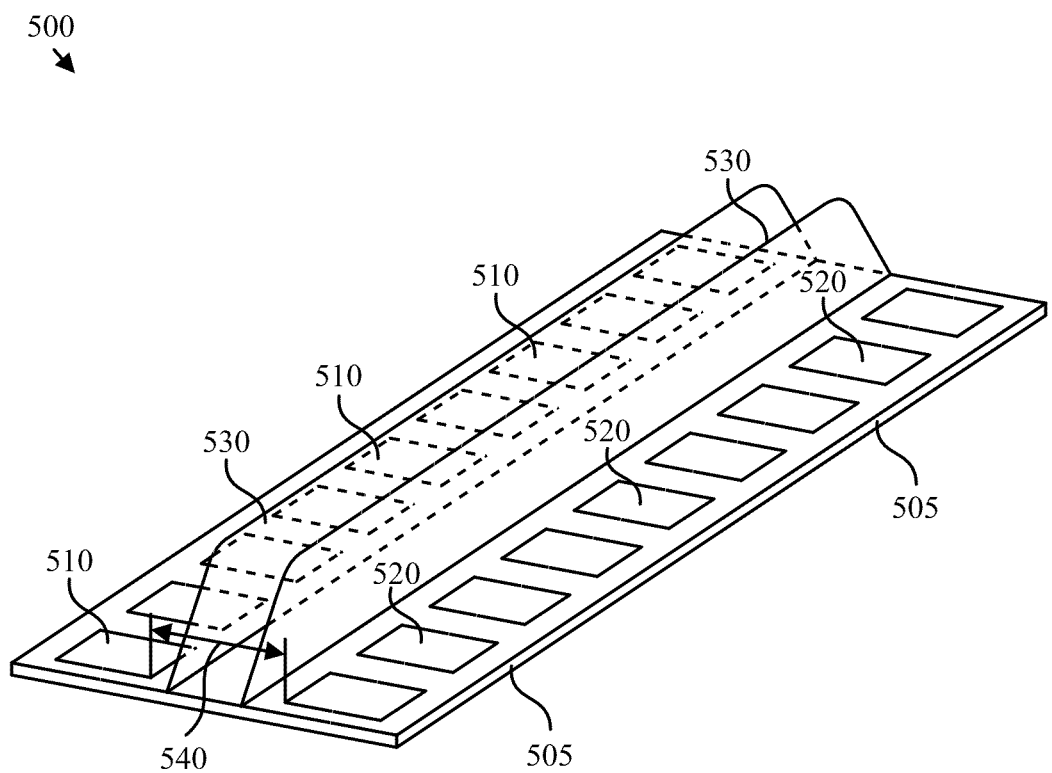
FIG. 5 is a perspective view diagram illustrating an antenna isolation structure that is consistent with one or more embodiments of the claimed inventions.
Figure 5:
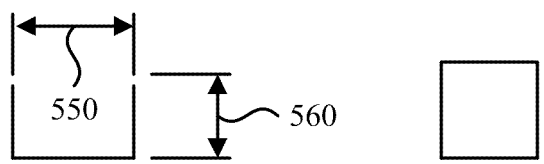

FIG. 5 is a perspective view diagram illustrating an antenna isolation structure 500 that is consistent with one or more embodiments of the claimed inventions. The antenna isolation structure 500 may include a printed circuit board 505 with a set of transmit patches 510, a set of receive patches 520, and an isolation element 530 affixed to the printed circuit board 505. The antenna isolation structure 500 electromagnetically isolates the receive patches from the transmit patches.

The transmit patches 510 may be dimensioned and spaced to directionally radiate a transmission signal while the receive patches 520 dimensioned and spaced to receive reflected images of the transmission signal. The isolation element 530 may be partially or fully (electrically) conductive to increase the electromagnetic isolation between the receive patches 520 and the transmit patches 510.

In one embodiment, the receive patches 520 are electromagnetically isolated from the transmit patches 510 by at least 25 dB. In the depicted embodiment, the transmit patches 510 and the receive patches 520 have a separation distance 540 of less than 2.5 wavelengths and the width 550 of the isolation element 530 is less than the separation distance between the transmit patches and the receive patches and equal to or greater than approximately one quarter of a wavelength for the transmission signal.

The height 560 of the isolation element 530 may be equal to or greater than approximately one quarter of a wavelength for the transmission signal. In the depicted embodiment, the isolation element 530 has a U-shaped cross sectional shape and is made from a partially (electrically) conductive material such as carbon fiber. The isolation element may also be formed from, or plated with, a conductive material.

Figure 6A:
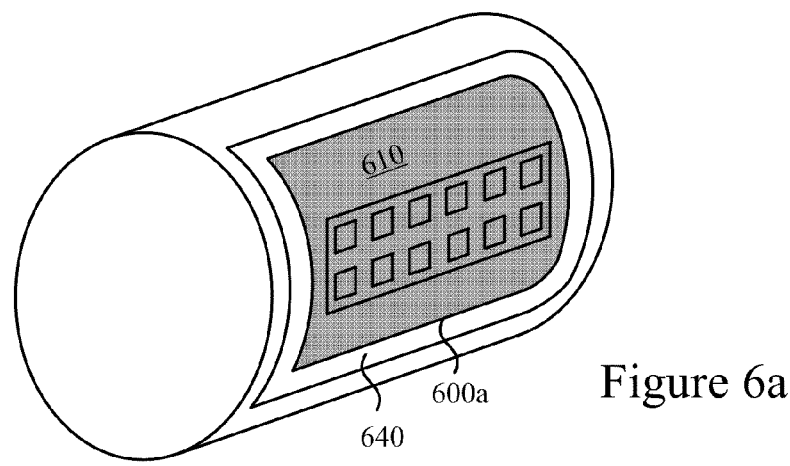
FIGS. 6a and 6b are perspective view diagrams illustrating two implementations of a breathable fabric radome 600 that are consistent with various embodiments of the claimed inventions.
Figure 6B:
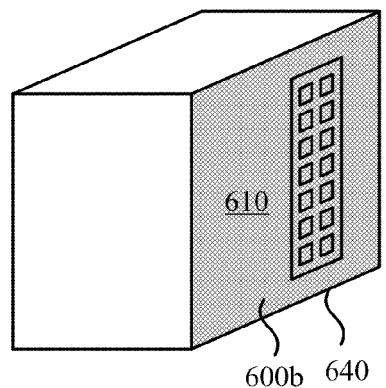
Figure 7:
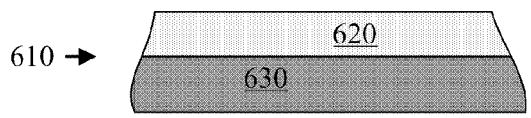
FIG. 7 is a cross sectional view of a water repellant breathable fabric used to construct the breathable fabric radomes depicted in FIGS. 6a and 6b.

FIGS. 6a and 6b are perspective view diagrams illustrating two implementations of a breathable fabric radome 600 that are consistent with various embodiments of the claimed inventions, while FIG. 7 is a cross sectional view of a water repellant breathable fabric 610 used to construct the breathable fabric radomes 600a and 600b depicted in FIGS. 6a and 6b. As depicted, the breathable fabric radomes 600a and 600b include a water repellent breathable fabric 610 with a porous membrane 620 and a fabric backing 630 attached to a frame 640. The breathable fabric radomes 600 reduce water condensation on a radar antenna and associated electronics while protecting the antenna and electronics from snow and rain.

The porous membrane capable 620 may be capable of passing water vapor without passing liquid water. In certain embodiments, the water repellent breathable fabric 610 is a GoreTex™ fabric with a loss tangent of less than 0.0003 and the porous membrane 620 has a thickness of less than 5 mils. In one embodiment, the water repellent breathable fabric 610 has a thickness equal to or less than 10 mils and the porous membrane 620 has a thickness equal to or less than 3 mils.

The fabric backing 630 may be bonded to the porous membrane 620 and provide strength to the water repellent breathable fabric 610. The fabric backing 630 may have a camaflouge pattern printed thereon or a color that matches a vehicle exterior. The water repellent breathable fabric 610 may be attached to the frame 640 or other structural member and shaped or formed to cover or encompass a radar antenna and associated electronics. In certain embodiments, the frame 640 and attached fabric 610 may be integrated into a fuselage as shown in FIG. 6a or an enclosure as shown in FIG. 6b.

Figure 8:
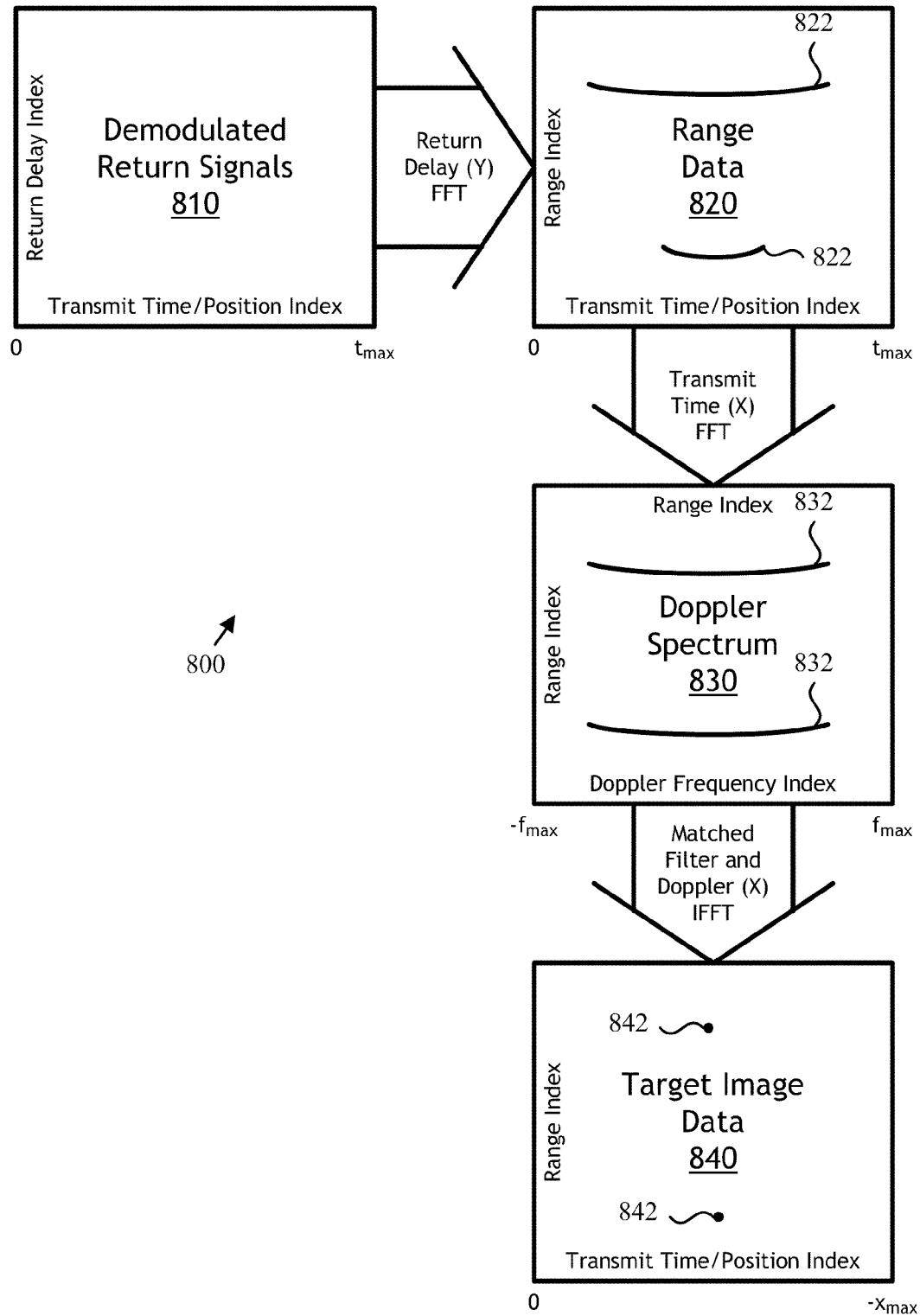
FIG. 8 is a data flow diagram depicting a radar image transformation sequence that is consistent with one or more embodiments of the claimed inventions.

FIG. 8 is a data flow diagram depicting a radar image transformation sequence 800 that is consistent with one or more embodiments of the claimed inventions. A radar antenna may project a series of radar transmissions from a vehicle. In certain embodiments, the transmissions may be directionally projected lateral to the movement of the vehicle, for example toward the ground and/or the horizon. A series of radar return signals corresponding to the series of radar transmissions may be received, demodulated, and stored as an array of demodulated return signals 810.

In certain embodiments, demodulation produces sinusoidal components within each demodulated return signal whose frequency corresponds to a distance to a reflecting object and whose amplitude corresponds to the strength of the reflection from the object. The demodulated radar return signals 810 may be presented to the video processor 124 as a sequence of scanlines where each scanline corresponds to a vertical column in the array 810. The video processor 124 may execute the various methods presented herein to provide target images and information to a user.

For example, a transform such as a Fourier transform may be conducted on each demodulated return signal to generate range data 820 for each transmission time index. Since the vehicle may be moving, each transmission time index may correspond to a position of the vehicle. The generated range data 820 indicates the relative strength and phase of reflections at each time index. As an object is approached and passed a curved (i.e. 'smile-shaped') ridge 822 may occur in the magnitude of the range data 820 indicating the range of that object from the vehicle over time. Generally speaking, objects that are farther offset from the vehicle in a lateral direction are in view of the radar beam for a longer interval resulting in a longer ridge 822.

Subsequent to generating range data 820, a transform may be conducted on each range to provide a Doppler spectrum 830. The Doppler spectrum 830 indicates the strength of various Doppler shift frequencies for each range and provides considerable information. Approaching objects generate a positive Doppler shift, while receding objects generate a negative Doppler shift. As an object is approached and passed a smile shaped ridge 832 may occur in the Doppler spectrum 830 indicating the Doppler shift frequencies generated by that object. Since the total Doppler shift generated by a passed object is substantially independent of range, each ridge 832 may have essentially the same length in the Doppler spectrum.

The Doppler spectrum may be transformed to target image data 840 with an inverse Fourier transform or the like. In certain embodiments, range migration correction is performed on the Doppler shift data to compensate for the range migration (i.e. smile shaped curvature) that occurs as a target is approached. A return signal correlation (i.e. matched) filter (not shown) may also be applied to the each range of the Doppler spectrum to compensate for the smearing of the objects into ridges. By multiplying each Doppler spectrum range by the frequency domain version of the return signal correlation filter each ridge 832 is effectively deconvolved into a precisely placed object 842.

Figure 9:
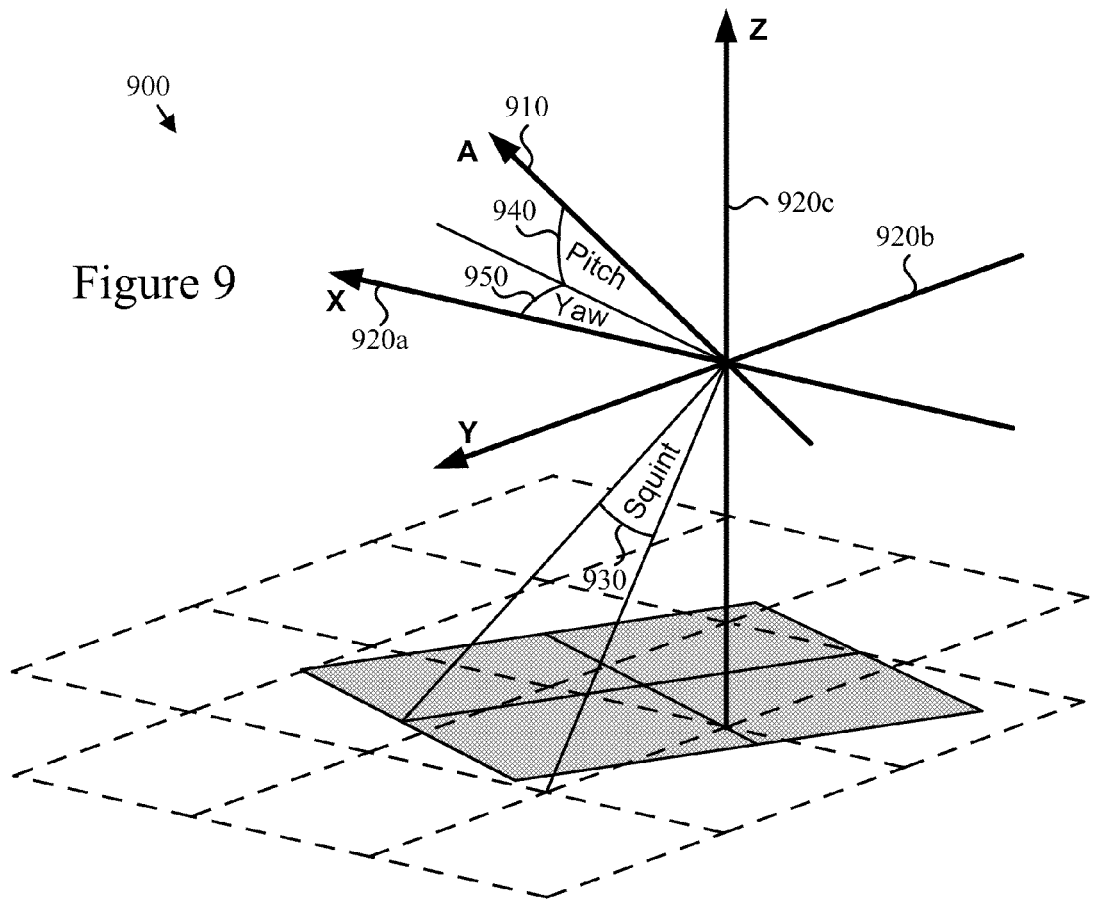
FIG. 9 is a geometric diagram illustrating the relationship between vehicle pitch, yaw, and squint that may leveraged by one or more embodiments of the claimed inventions.

FIG. 9 is a geometric diagram illustrating the relationship between vehicle pitch and yaw, and radar squint that may be leveraged by one or more embodiments of the claimed inventions. Due to a variety of factors, the attitude or orientation 910 of a vehicle or craft may be different than the current travel path for the vehicle which is shown in FIG. 9 as the X axis 920a. The X axis 920a along with a horizontal or Y axis 920b and a vertical or Z axis 920c define a vehicle relative coordinate system useful for processing data provided by a radar antenna mounted on the vehicle.

The terrain that is seen by a radar antenna may be skewed by the orientation of the vehicle 910 shown in the diagram as vector A. The effective viewing window of the radar antenna, known as antenna squint 930, may affect the quality of data generated by a radar system. As is shown in FIG. 9, the antenna squint 930 may be a function of the pitch 940 and yaw 950 of the vehicle. Many of the methods presented herein were developed to determine and account for the attitude related parameters of a vehicle such as vehicle pitch and yaw and antenna squint.

Figure 10:
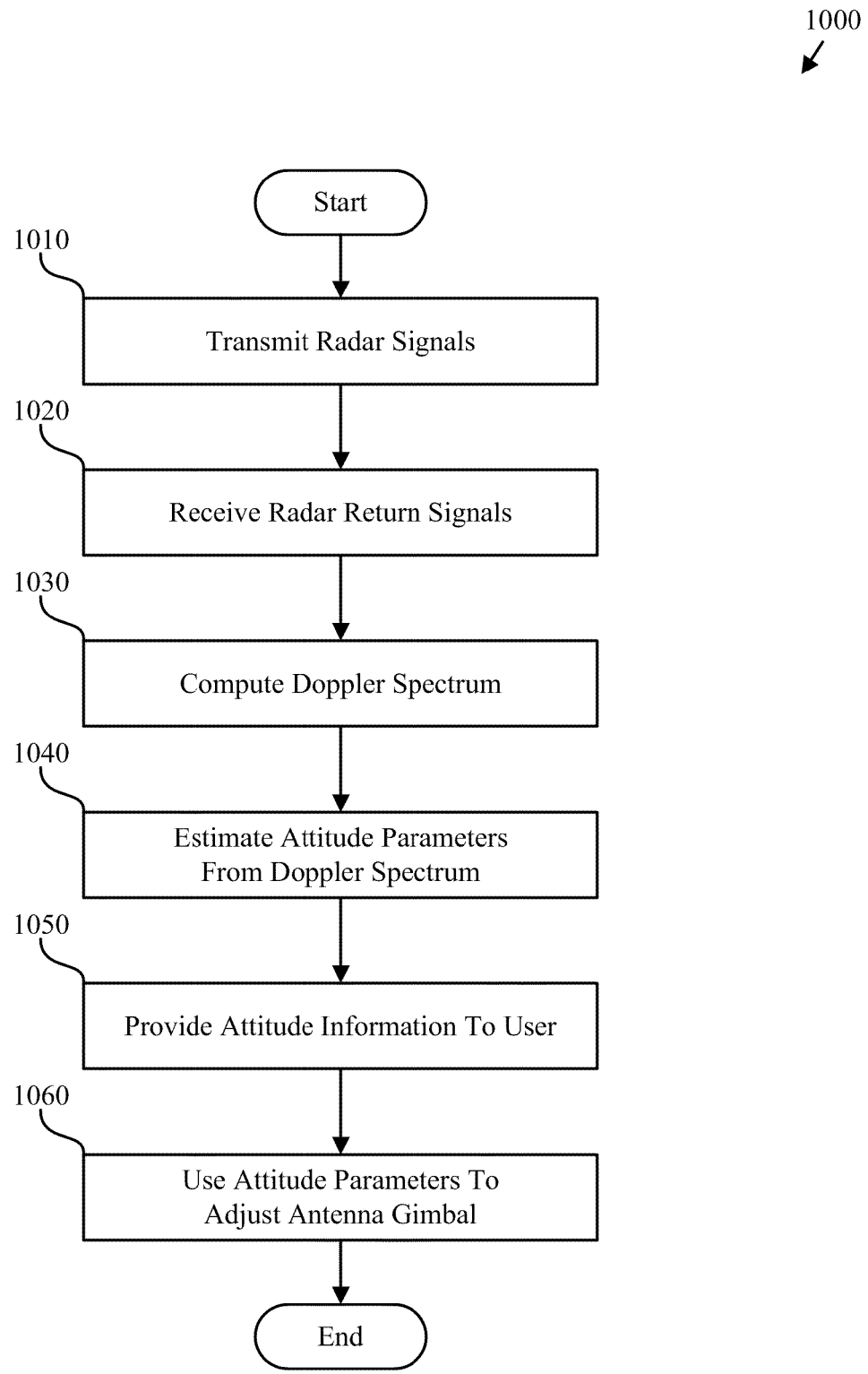
FIG. 10 is a flow chart diagram depicting an attitude estimation and gimballing method that is consistent with one or more embodiments of the claimed inventions.

FIG. 10 is a flow chart diagram depicting an attitude estimation and gimballing method 1000 that is consistent with one or more embodiments of the claimed inventions. As depicted, the attitude estimation and gimballing method 1000 includes transmitting 1010 a series of radar signals, receiving 1020 a corresponding series of radar return signals, computing 1030 a Doppler spectrum, estimating 1040 one or more attitude parameters from the Doppler spectrum, providing 1050 attitude information to a user, and adjusting 1060 an antenna gimbal to compensate for the estimated attitude parameters. The depicted method 1000 enables a radar system to leverage information available in a Doppler spectrum to improve radar imaging clarity.

Transmitting 1010 a series of radar signals may include repeatedly transmitting a particular signal such as an FM chirp signal. In one embodiment, an FM chirp signal is repeatedly transmitted by frequency modulating a carrier signal with a sawtooth wave. In response thereto, a radar antenna may receive 1020 a series of radar return signals. The radar return signals may be a superposition of reflections from various objects.

As detailed in the description of FIG. 8, computing 1030 a Doppler spectrum may include demodulating the return signals with an FM transmission signal or the like to provide a demodulated return signal. The demodulated return signal may comprise a number of sinusoidal components each having a frequency that is proportional to the distance to a reflecting object corresponding to the sinusoidal component in the demodulated return signal. A transform such as a Fourier transform may be conducted on each demodulated return signal to generate range data indicating the relative strength of reflections at each range distance for a particular time/position index. Subsequently, another transform may be conducted on each range over time to provide a Doppler spectrum.

The method 1000 may continue by estimating 1040 one or more attitude parameters from the Doppler spectrum. In certain embodiments, the attitude parameters are estimated by computing a centroid for each range in the Doppler spectrum. The placement of centroids in the Doppler spectrum as a function of range may indicate the attitude of the vehicle. See FIGS. 11*a* and 11*b*. In one particular embodiment, an antenna squint is estimated as function of pitch and yaw with a least squares estimation process using the equation squint=H/R*pitch+yaw*sqrt[1−(H/R)^2], where H is a vehicle height and R is the range from the vehicle. By minimizing the error for the antenna squint, the method 1000 may also provide estimates of the vehicle pitch and yaw.

Subsequent to estimating 1040 one or more attitude parameters from the Doppler spectrum, the method may continue by leveraging the attitude parameters. In the depicted embodiment, the method continues by providing 1050 attitude information to a user, and adjusting 1060 an antenna gimbal to compensate for the estimated attitude parameters. Adjusting 1060 an antenna gimbal may improve the quality of data collected with a radar system by aligning the antenna with the actual travel path of the vehicle. As is subsequently disclosed, the attitude parameters may be used to improve the processing of radar data and the quality of the information extracted therefrom.

Figure 11A:
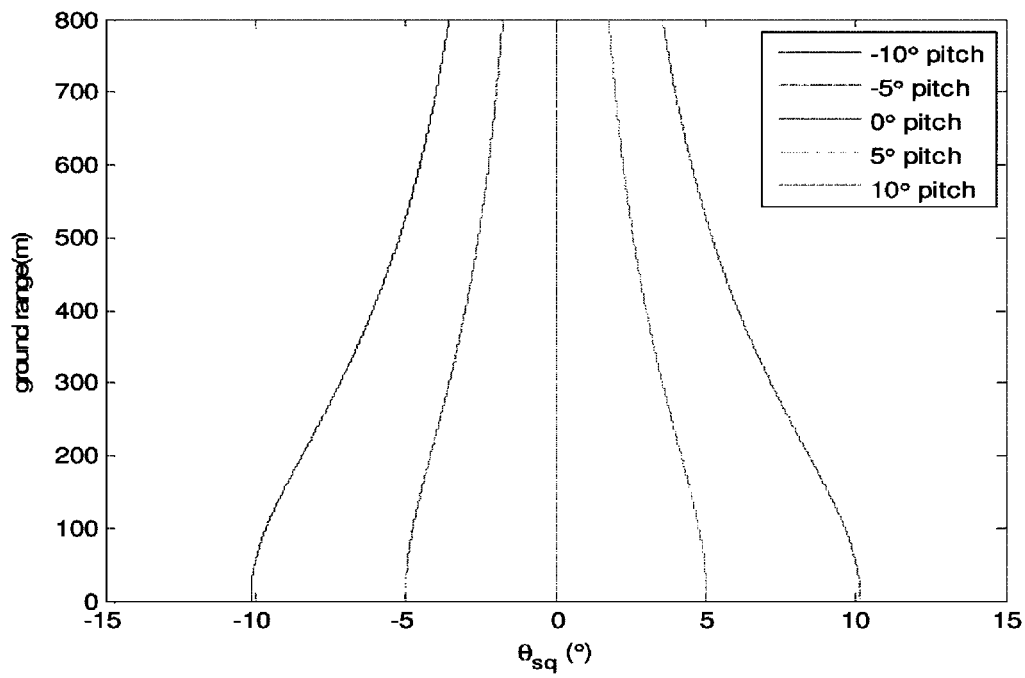
FIGS. 11a and 11b are data graphs illustrating the relationship between vehicle pitch and yaw on the Doppler centroid as a function of range that may be leveraged by one or more embodiments of the claimed inventions.
Figure 11B:
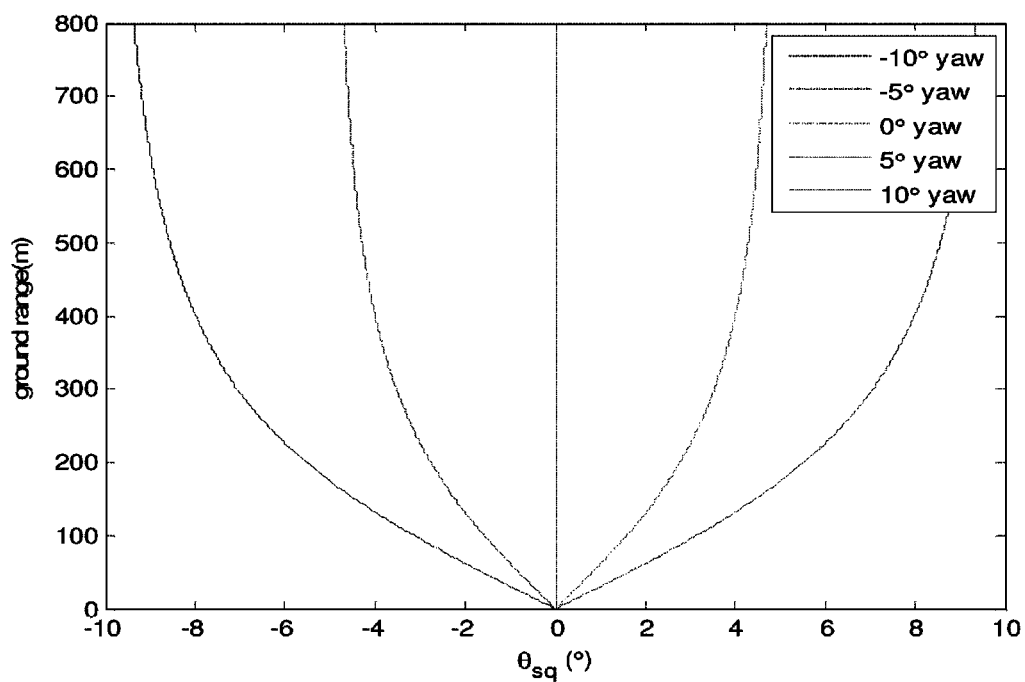

FIGS. 11*a* and 11*b* are data graphs illustrating one example of the relationship between vehicle pitch and yaw on the location of the Doppler centroid as a function of range. FIG. 11*a* illustrates the effect of pitch on the position of the Doppler centroid, while FIG. 11*b* illustrates the effect of yaw on the position of the Doppler centroid. The illustrated relationships may be leveraged by the methods described herein to estimate one or more attitude parameters such as vehicle pitch and yaw and antenna squint.

Figure 12A:
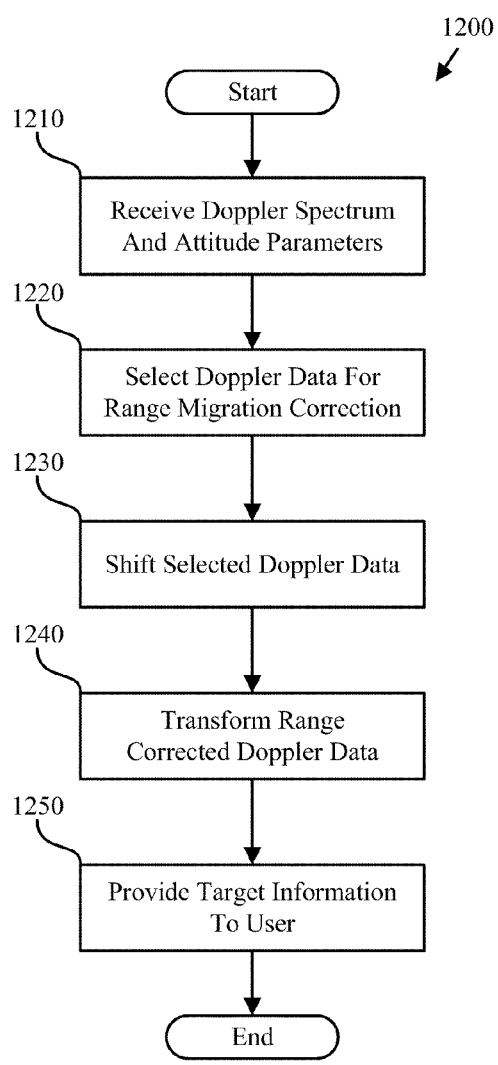
FIG. 12a is a flow chart diagram depicting a range migration correction method that is consistent with one or more embodiments of the claimed inventions.
Figure 12B:
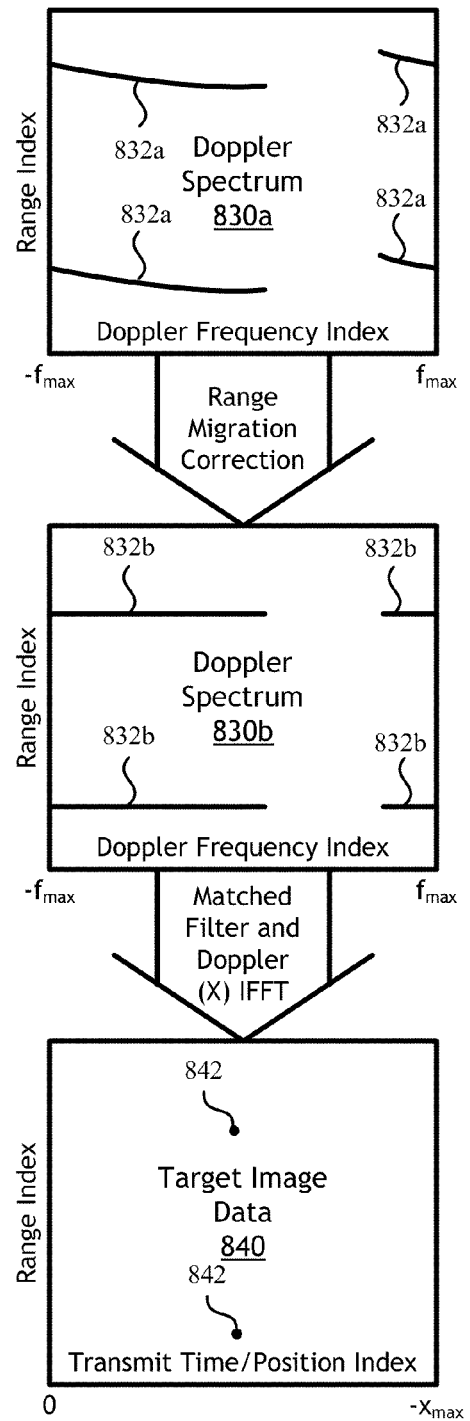
FIG. 12b is a data flow diagram depicting a radar image transformation sequence that is consistent with one or more embodiments of the claimed inventions.

FIG. 12*a* is a flow chart diagram depicting a range migration correction method 1200 that is consistent with one or more embodiments of the claimed inventions, while FIG. 12*b* is a data flow diagram depicting a radar image transformation sequence that is consistent with the range migration correction method 1200. As depicted, the range migration correction method 1200 includes receiving 1210 a Doppler spectrum 830*a* and corresponding attitude parameters, selecting 1220 Doppler data for range migration correction, shifting 1230 the selected Doppler data, transforming 1240 the Doppler data, and providing 1250 target information to a user.

Receiving 1210 may include receiving attitude parameters that were extracted from the Doppler spectrum 830*a*. The attitude parameters may correspond to the shifting and/or skewing of range data 832*a* that may occur due to radar squint or the like. Selecting 1220 Doppler data for range migration correction selects that data which could benefit from migration correction previous to forming a target image. In the example depicted in FIG. 12*b*, the data that could benefit from migration correction includes the columns of data corresponding to the curved ridges 832*a* in general and the sloped portions of the curved ridges 832*a* in particular.

The method proceeds by shifting 1230 the selected Doppler data to correct for range migration in order to align data corresponding to a reflecting object into the same or nearly the same range. In certain embodiments, shifting 1230 the selected Doppler data occurs by conducting a frequency scaling algorithm. In one embodiment, Doppler data is shifted (vertically in the Doppler spectrum 830) a discrete number of cells where the number of cells is a function of the Doppler frequency. In other embodiments, shifting may involve interpolating, summing, or spatially filtering data from multiple cells.

Subsequent to shifting 1230 the selected Doppler data, the method 1200 is completed by transforming 1240 the Doppler data to target image data and providing 1250 target information corresponding to the target image data to a user. Transforming 1240 the Doppler data to target image data may produce a target object 842 at a position corresponding to the lowest point along each curved ridge 832*a*.

Figure 13:
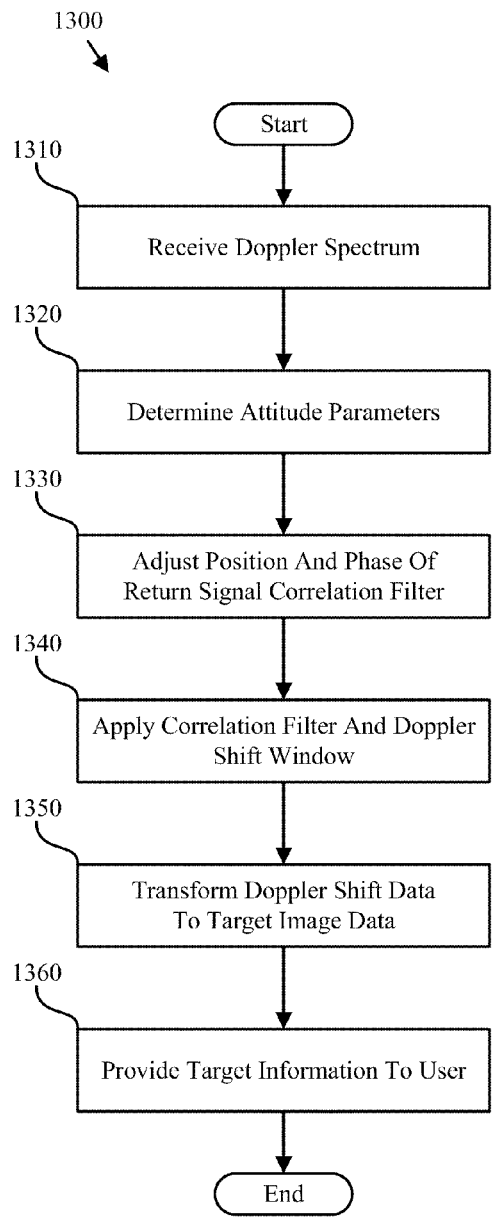
FIG. 13 is a flow chart diagram depicting a target image processing method that is consistent with one or more embodiments of the claimed inventions.

FIG. 13 is a flow chart diagram depicting a target image processing method 1300 that is consistent with one or more embodiments of the claimed inventions. As depicted, the target image processing method 1300 includes receiving 1310 a Doppler spectrum, determining 1320 one or more attitude parameters, adjusting 1330 a return signal correlation filter, applying 1340 the return signal correlation filter and a Doppler shift window along each range, transforming 1350 the Doppler shift data to target image data, and providing 1360 target information to a user. The target image processing method 1300 improves the quality of the target image data and information extracted therefrom.

Receiving 1310 a Doppler spectrum and determining 1320 one or more attitude parameters may be accomplished in a manner that is consistent with steps 1030 and 1040 of the attitude estimation and gimballing method 1000 or similar methods disclosed herein. Adjusting 1330 a return signal correlation filter may include adjusting the location and phase of the return signal correlation filter (i.e. matched filter) and location of a corresponding windowing function.

The location or Doppler frequency interval of the return signal correlation filter and the windowing function may correspond to the Doppler frequency interval of the ridges 832. The placement of the ridges 832 may be due to the attitude of the vehicle and/or the orientation of the transmitting antenna and correlate to the attitude parameters determined in step 1320. Therefore, the Doppler frequency interval to which the return signal correlation filter and the windowing function are applied may be the same or essentially the same for each ridge within a particular Doppler spectrum. In certain embodiments, the phase of the return signal correlation filter and the location or Doppler frequency interval the filter is applied to, is determined by the received attitude parameters. In one embodiment, the phase of the return signal correlation filter may be calculated for each ridge in the Doppler spectrum according to the formula $MF[I,J]=(2*pi*F0/c)*(J*V)^2/R[I]$ where F0 is the carrier frequency of the radar signal, J is the index of the Doppler spectrum column, V is the velocity of the vehicle, and R[I] is the range distance of the Doppler spectrum row.

Applying 1340 a return signal correlation filter and a Doppler shift window along each range of the Doppler spectrum facilitates generation of more precise target image data. Subsequently, transforming 1350 the Doppler shift data to target image data enables extraction of target information and providing 1360 the target information to a user.

Figure 14:
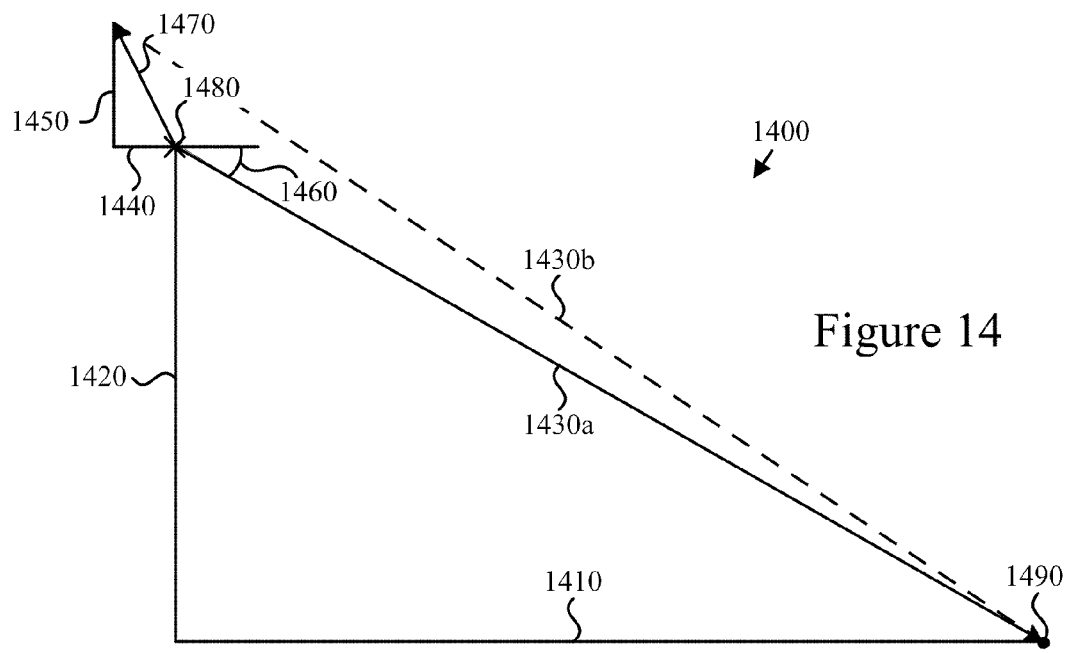
FIG. 14 is a geometric diagram depicting certain geometric relationships that may be leveraged in the motion compensation method of FIG. 15.

FIG. 14 is a geometric diagram depicting certain geometric relationships 1400 that may be leveraged in the motion compensation method of FIG. 15 described below. [Note: FIG. 14 is shown on the same drawing sheet as FIG. 9.] As depicted, the geometrical relationships 1400 include a ground range 1410, an altitude 1420, a slant distance or range distance 1430, a horizontal displacement 1440, a vertical displacement 1450, a depression angle 1460, and a total displacement 1470. The geometrical relationships 1400 enable the detection of deviations from a level parallel flight 1480 (into the page) relative to a target 1490, and correction of an old range distance estimate 1430a to a new range distance estimate 1430b.

Figure 15:
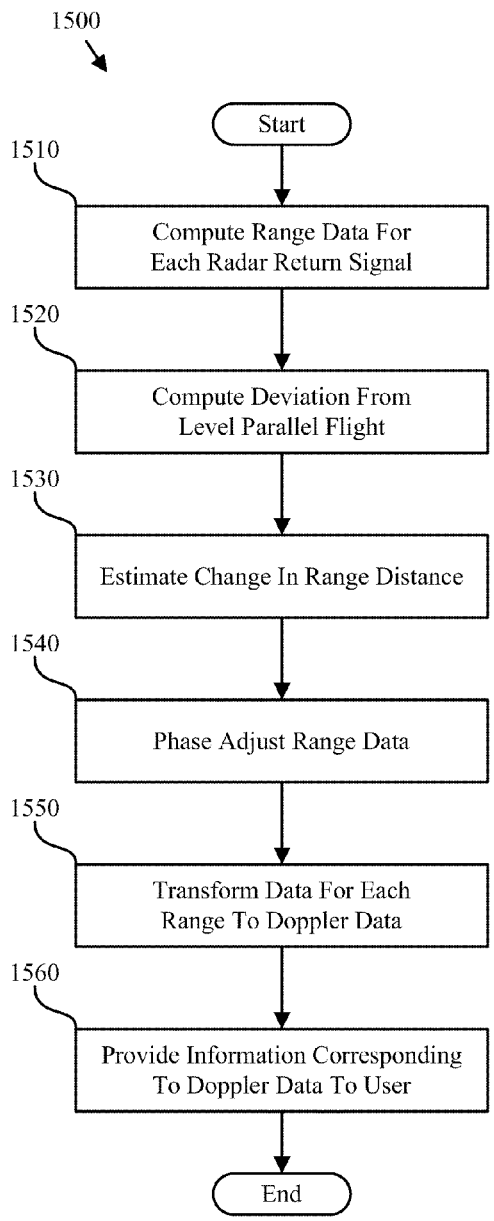
FIG. 15 is a flow chart diagram depicting a motion compensation method that is consistent with one or more embodiments of the claimed inventions.

FIG. 15 is a flow chart diagram depicting a motion compensation method 1500 that is consistent with one or more embodiments of the claimed inventions. As depicted, the motion compensation method includes computing 1510 range data for each radar return signal, computing 1520 a deviation from a level parallel flight, estimating 1530 a change in range distance, phase adjusting 1540 range data, transforming 1550 data for each range to Doppler data, and providing 1560 information corresponding to Doppler data to the user.

Computing 1510 range data for each radar return signal may occur in a manner that is consistent with the description of FIG. 8. Computing 1520 a deviation from a level parallel flight may include computing the horizontal displacement 1440, the vertical displacement 1450, and the depression angle 1460. Estimating 1530 a change in range distance may include using the geometrical relationships shown in FIG. 14 to compute a difference between the new range distance 1430b and the old range distance 1430a. In one embodiment, a change in range distance DR is estimated as $dR=\cos(DA)*VD+\sin(DA)*HD$ where DA is the depression angle 1460, VD is the vertical deviation or displacement 1450, and HD is the horizontal deviation or displacement 1440.

The depicted method may be completed by phase adjusting 1540 range data according to the change in range distance, transforming 1550 data for each range to Doppler data, and providing 1560 information corresponding to the Doppler data to the user.

Figure 16:
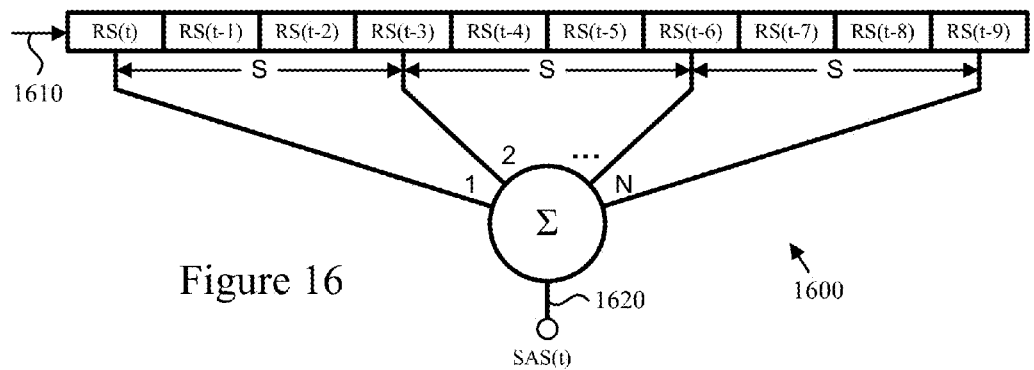
FIG. 16 is a data flow diagram depicting a synthetic aperture processing method that is consistent with one or more embodiments of the claimed inventions.

FIG. 16 is a data flow diagram depicting a synthetic aperture processing method 1600 that is consistent with one or more embodiments of the claimed inventions. As depicted, the synthetic aperture processing method 1600 includes buffering a series of radar return signals 1610 provided by the radar data acquisition module or the like, and summing N non-adjacent radar return signals to provide a synthetic aperture return signal 1620.

Summing the N non-adjacent return signals may include applying a taper to the N non-adjacent return signals to provide a weighted sum of the non-adjacent return signals. The N non-adjacent radar return signals may be separated by a pseudo aperture spacing S. In the depicted embodiment, N is equal to 4 and S is equal to 3. By selecting N and S to be relatively prime (i.e. with no common factors), the effective radar transmission pattern may be significantly narrowed.

Figure 17:
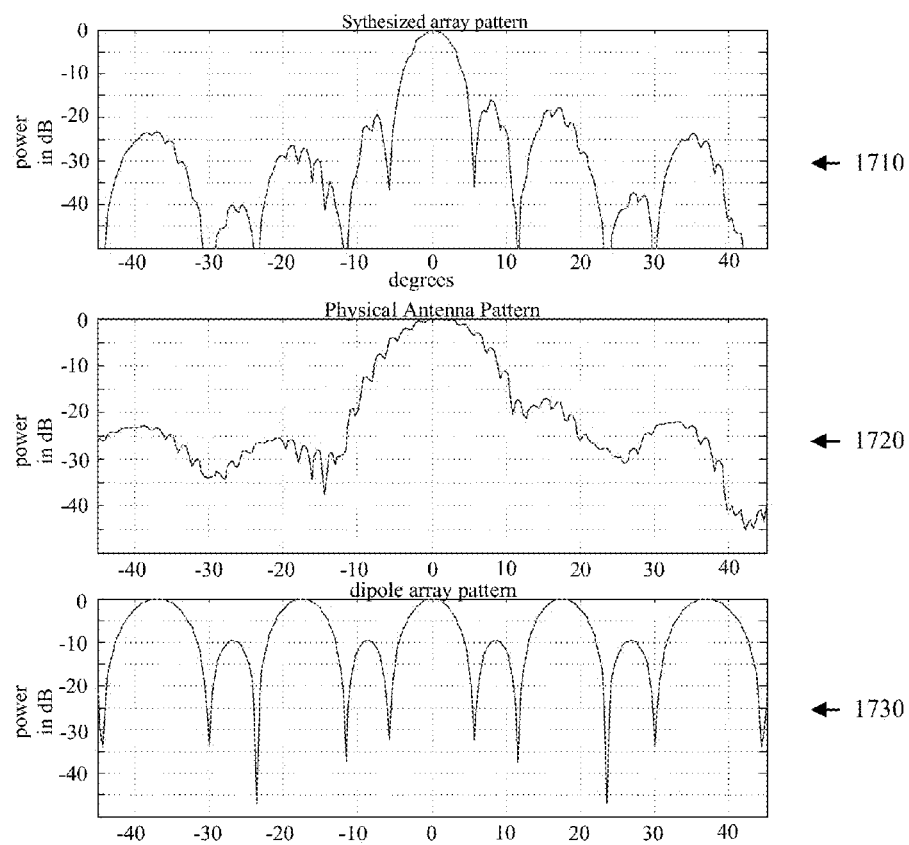
FIG. 17 is a graphical diagram illustrating the effect of the method of FIG. 16.

FIG. 17 is a graphical diagram illustrating one example of the effect of the method of FIG. 16. By selecting N and S to be relatively prime, an effective radar transmission pattern 1710 may be the product of the actual transmission pattern 1720 and the synthetic dipole pattern 1730.

Figure 18:
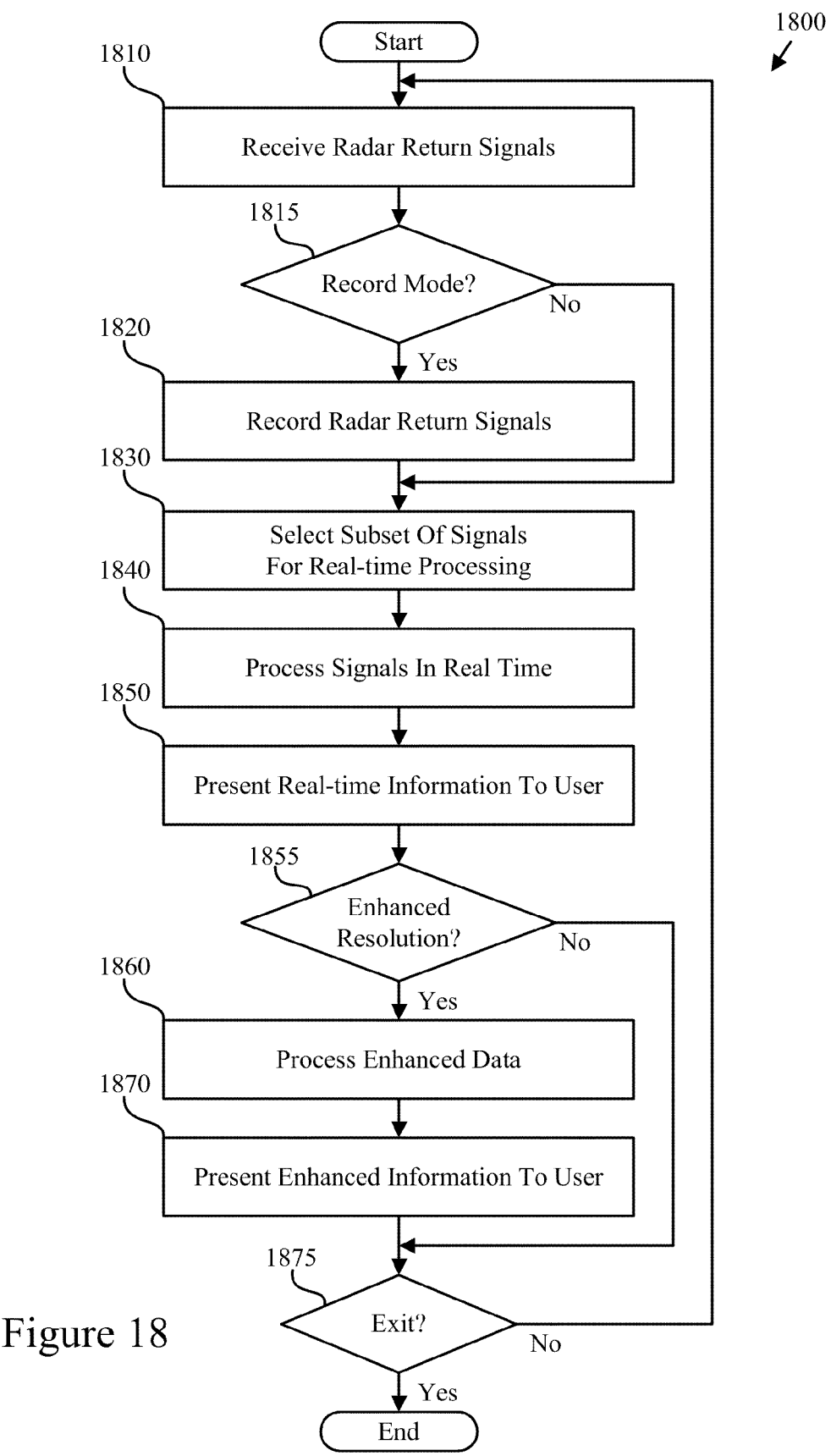
FIG. 18 is a flow chart diagram depicting an enhanced resolution processing method that is consistent with one or more embodiments of the claimed inventions.

FIG. 18 is a flow chart diagram depicting an enhanced resolution processing method 1800 that is consistent with one or more embodiments of the claimed inventions. As depicted, the enhanced resolution processing method 1800 includes, receiving 1810 a series of radar return signals, determining 1815 whether a record mode is active, recording 1820 the radar return signals, selecting 1830 a subset of return signals for real-time processing, processing 1840 the return signals in real-time, presenting 1850 real-time information to a user, determining 1855 whether an enhanced resolution is active, processing 1860 the enhanced data, and presenting 1870 advanced information to a user. The enhanced resolution processing method 1800 enables a radar system to provide standard radar information in real-time, while providing enhanced information at a deferred time.

Receiving 1810 a series of radar return signals may include receiving return signals from a radar antenna. If the record mode is active, the method may continue by recording 1820 the radar return signals for subsequent enhanced resolution use. Selecting 1830 a subset of return signals for real-time processing enables a radar system to process 1840 the selected return signals and present 1850 corresponding information to a user in real-time.

The method continues by determining 1855 whether an enhanced resolution mode is active. If the enhanced resolution mode is active, the method processes 1860 the enhanced data and presents 1870 enhanced information such as enhanced resolution data to a user. The enhanced resolution data may be presented at a deferred time instead of real-time. Subsequently, the method determines 1875 whether a user desires to exit the method 1800. If the user does not desire to exit the method 1800, the method loops to step 1810, otherwise the method terminates.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for acquiring and processing radar data, the apparatus comprising:
   a radar antenna comprising a multilayer printed circuit board, the multilayer printed circuit board comprising a plurality of antenna elements including a plurality of transmit patches configured to directionally radiate a transmission signal and a plurality of receive patches configured to receive reflected images of the transmission signal;
   the radar antenna further comprising an isolation element affixed to the multilayer printed circuit board and disposed between the transmit patches and the receive patches, the isolation element configured to electromagnetically isolate the receive patches from the transmit patches;
   a radar transmitter operably connected to the radar antenna;
   a radar receiver operably connected to the radar antenna;
   an enclosure formed from a plastic material with a gimbal mount integrally formed therein, the enclosure comprising a transmitter chamber configured to cover at least a portion of the radar transmitter and a receiver chamber configured to cover at least a portion of the radar receiver, the enclosure formed from a 3-D printing process and electroplated to electromagnetically isolate the receiver chamber from the transmitter chamber;
   a radome formed of a water repellent breathable fabric and configured to cover the radar antenna, the water repellent breathable fabric comprising a porous membrane capable of passing water vapor without passing liquid water and a fabric backing bonded to the porous membrane;
   a radar data acquisition module configured to convert a demodulated radar return signal provided by the radar receiver to a digital baseband signal;
   the radar data acquisition module configured to provide the digital baseband signal as a sequence of scanlines;
   a radar data processing module comprising a video processor configured to receive the sequence of scanlines and programmed to compute Doppler shift data for a plurality of ranges from the sequence of scanlines, and estimate a vehicle pitch and yaw from the Doppler shift data;
   the radar data processing module further configured to initiate an orientation adjustment of the radar antenna to compensate for the vehicle pitch and yaw.

2. The apparatus of claim 1, wherein the target information comprises magnitude and phase information corresponding to at least one target.

* * * * *